US009854459B2

(12) United States Patent
Zhou et al.

(10) Patent No.: US 9,854,459 B2
(45) Date of Patent: Dec. 26, 2017

(54) NETWORK-BASED ALARMING AND NETWORK-BASED RECONFIGURATION

(71) Applicant: QUALCOMM Incorporated, San Diego, CA (US)

(72) Inventors: Yan Zhou, San Diego, CA (US); Mehmet Yavuz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 304 days.

(21) Appl. No.: 13/797,793

(22) Filed: Mar. 12, 2013

(65) Prior Publication Data

US 2014/0269251 A1 Sep. 18, 2014

(51) Int. Cl.
*H04W 24/04* (2009.01)
*H04W 24/02* (2009.01)

(52) U.S. Cl.
CPC ............ *H04W 24/04* (2013.01); *H04W 24/02* (2013.01)

(58) Field of Classification Search
CPC ..... H04W 48/02; H04W 4/08; H04W 84/045; H04W 12/08; H04W 60/00; H04W 52/40; H04W 52/244; H04W 24/02; H04W 52/247; H04W 52/386
See application file for complete search history.

(56) References Cited

U.S. PATENT DOCUMENTS

| | | | |
|---|---|---|---|
| 8,295,215 B2 | 10/2012 | Morrill et al. | |
| 2008/0095108 A1* | 4/2008 | Malladi | H04B 1/713 370/329 |
| 2009/0122839 A1* | 5/2009 | Luo | H04B 1/70735 375/145 |
| 2009/0135803 A1* | 5/2009 | Luo | H04L 5/0007 370/350 |
| 2009/0247156 A1* | 10/2009 | Sampath | H04W 36/0083 455/434 |
| 2010/0002676 A1* | 1/2010 | Doi | H04W 74/04 370/345 |
| 2010/0027469 A1 | 2/2010 | Gurajala et al. | |

(Continued)

FOREIGN PATENT DOCUMENTS

| | | | |
|---|---|---|---|
| GB | 2478978 A | 9/2011 | |
| WO | WO 2010106398 | * 1/2009 | .............. H04W 8/18 |

OTHER PUBLICATIONS

International Search Report and Written Opinion—PCT/US2014/021847—ISA/EPO—Nov. 5, 2014.

(Continued)

*Primary Examiner* — Jung-Jen Liu
(74) *Attorney, Agent, or Firm* — MG-IP Law, P.C.

(57) ABSTRACT

Techniques for supporting communication by base stations are disclosed. In an aspect of the present disclosure, for network-based alarming, a base station may notify a designated user equipment (UE) whenever certain trigger events occurred at the base station. The base station may send notification messages for detected trigger events to the UE for timely intervention. In another aspect of the present disclosure, for network-based reconfiguration, a base station for a small cell may be reconfigured by a network server based on performance metrics for base stations in a wireless system. The reconfiguration may improve the performance of the base station and possibly other base stations in the wireless system.

43 Claims, 7 Drawing Sheets

(56) References Cited

U.S. PATENT DOCUMENTS

| | | | | |
|---|---|---|---|---|
| 2010/0075635 A1* | 3/2010 | Lim | H04W 4/08 | 455/411 |
| 2010/0110873 A1* | 5/2010 | Han | H04J 13/0062 | 370/208 |
| 2010/0118837 A1* | 5/2010 | Bracha | H04W 56/00 | 370/336 |
| 2010/0118839 A1* | 5/2010 | Malladi | H04B 7/0617 | 370/336 |
| 2010/0190498 A1* | 7/2010 | Ha | H04W 60/00 | 455/435.1 |
| 2010/0261467 A1* | 10/2010 | Chou | H04W 24/02 | 455/422.1 |
| 2010/0330994 A1* | 12/2010 | Matsuo | H04J 11/0069 | 455/436 |
| 2011/0009105 A1 | 1/2011 | Lee et al. | | |
| 2011/0032816 A1 | 2/2011 | Isaksson et al. | | |
| 2011/0047011 A1 | 2/2011 | Tirpak | | |
| 2011/0081897 A1* | 4/2011 | Beattie, Jr. | H04W 24/02 | 455/418 |
| 2011/0085525 A1 | 4/2011 | Patini | | |
| 2011/0216732 A1* | 9/2011 | Maeda | H04W 48/08 | 370/329 |
| 2011/0216741 A1* | 9/2011 | Yang | H04L 1/0041 | 370/331 |
| 2011/0319012 A1* | 12/2011 | Park | H04B 7/155 | 455/7 |
| 2012/0014308 A1* | 1/2012 | Li | H04W 24/02 | 370/312 |
| 2012/0014332 A1* | 1/2012 | Smith | H04W 16/14 | 370/329 |
| 2012/0052857 A1 | 3/2012 | Kumar et al. | | |
| 2012/0076016 A1 | 3/2012 | Robbins et al. | | |
| 2012/0083270 A1 | 4/2012 | Robbins et al. | | |
| 2012/0100844 A1* | 4/2012 | Baldemair | H04W 24/02 | 455/418 |
| 2012/0178452 A1 | 7/2012 | Reagan et al. | | |
| 2012/0230299 A1* | 9/2012 | Shu | H04W 24/02 | 370/331 |
| 2012/0257503 A1 | 10/2012 | Vrbaski et al. | | |
| 2012/0309394 A1* | 12/2012 | Radulescu | H04W 36/0055 | 455/436 |
| 2012/0314566 A1* | 12/2012 | Lee | H04W 76/028 | 370/225 |
| 2012/0315907 A1* | 12/2012 | Chin | H04W 36/22 | 455/436 |
| 2013/0044675 A1* | 2/2013 | Zhang | H04B 7/155 | 370/315 |
| 2013/0130688 A1* | 5/2013 | Chin | H04W 36/22 | 455/436 |
| 2013/0157643 A1* | 6/2013 | Yoo | H04W 24/02 | 455/418 |
| 2013/0170470 A1* | 7/2013 | Kneckt | H04W 72/0446 | 370/330 |
| 2013/0183905 A1* | 7/2013 | Richardson | H04W 56/0015 | 455/67.11 |
| 2013/0201884 A1* | 8/2013 | Freda | H04W 72/005 | 370/278 |
| 2014/0024382 A1* | 1/2014 | Zou | H04W 16/08 | 455/445 |
| 2014/0056169 A1* | 2/2014 | Jung | H04W 24/10 | 370/252 |
| 2014/0080468 A1* | 3/2014 | Zhang | H04W 24/02 | 455/418 |
| 2014/0092771 A1* | 4/2014 | Siomina | H04W 24/08 | 370/252 |
| 2014/0112254 A1* | 4/2014 | Lindoff | H04W 74/002 | 370/328 |
| 2014/0126530 A1* | 5/2014 | Siomina | H04W 52/146 | 370/330 |
| 2014/0177430 A1* | 6/2014 | Hassett | H04L 41/0609 | 370/216 |
| 2014/0177588 A1* | 6/2014 | Chun | H04W 56/0015 | 370/330 |
| 2014/0198744 A1* | 7/2014 | Wang | H04B 7/0617 | 370/329 |
| 2014/0204809 A1* | 7/2014 | Kim | H04J 13/0062 | 370/280 |
| 2014/0325597 A1* | 10/2014 | Ore | H04W 12/08 | 726/3 |
| 2015/0024746 A1* | 1/2015 | Adachi | H04W 12/06 | 455/435.1 |
| 2015/0087313 A1* | 3/2015 | Kim | H04W 8/02 | 455/437 |
| 2015/0126188 A1* | 5/2015 | Lindoff | H04W 8/005 | 455/434 |

OTHER PUBLICATIONS

Partial International Search Report—PCT/US2014/021847—ISA/EPO—Jul. 25, 2014.

* cited by examiner

NETWORK-BASED ALARMING AND NETWORK-BASED RECONFIGURATION

BACKGROUND

I. Field

The present disclosure relates generally to communication, and more specifically to techniques for supporting wireless communication.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless system may include one or more base stations that can support communication for one or more user equipments (UEs). A UE may communicate with a base station via the downlink and uplink. The downlink (or forward link) refers to the communication link from the base station to the UE, and the uplink (or reverse link) refers to the communication link from the UE to the base station.

A wireless system may include a number of small cells. A "cell" may refer to a base station and/or a coverage area of the base station, depending on the context in which the term is used. A small cell is a cell providing communication coverage for a small geographic area such as a home, an apartment, an office, a shop, etc. A small cell may include a base station, which may have an Internet backhaul to a network server and may support wireless communication for UEs within the coverage of the small cell. It may be desirable to efficiently support communication for UEs via small cells.

SUMMARY

Techniques for supporting communication by base stations are disclosed herein. In an aspect of the present disclosure, which may be referred to as network-based alarming, a base station may notify a designated UE whenever certain trigger events occur at the base station. The base station may send notification messages for detected trigger events to a manager (e.g., an owner) of the base station for timely intervention. In one design, the base station may detect a trigger event related to performance or status of the base station. The base station may send a notification of the trigger event to a UE designated to receive the notification. The base station may also send at least one recommendation to address the trigger event. A corrective action for the trigger event may be performed for the base station.

In another aspect of the present disclosure, which may be referred to as network-based reconfiguration, a base station for a small cell may be reconfigured by a network server based on performance metrics for base stations in a wireless system. The reconfiguration may improve the performance of the base station and possibly other base stations in the wireless system. In one design, the base station may determine at least one performance metric for the base station and may send the at least one performance metric to the network server. The base station may thereafter receive reconfiguration information from the network server. The reconfiguration information may be determined by the network server based on performance metrics received from a plurality of base stations including the base station. The base station may be reconfigured based on the reconfiguration information received from the network server.

Various aspects and features of the disclosure are described in further detail below.

DETAILED DESCRIPTION

The techniques described herein may be used for various wireless communication systems such as CDMA, TDMA, FDMA, OFDMA, SC-FDMA and other wireless systems. The terms "system" and "network" are often used interchangeably. A CDMA system may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 includes IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi and Wi-Fi Direct), IEEE 802.16 (WiMAX), IEEE 802.20, Flash-OFDM®, etc. UTRA, E-UTRA, and GSM are part of Universal Mobile Telecommunication System (UMTS). 3GPP Long Term Evolution (LTE) and LTE-Advanced (LTE-A), in both frequency division duplexing (FDD) and time division duplexing (TDD), are recent releases of UMTS that use E-UTRA, which employs OFDMA on the downlink and SC-FDMA on the uplink. UTRA, E-UTRA, GSM, UMTS, LTE and LTE-A are described in documents from an organization named "3rd Generation Partnership Project" (3GPP). cdma2000 and UMB are described in documents from an organization named "3rd Generation Partnership Project 2" (3GPP2). The techniques described herein may be used for the wireless systems and radio technologies mentioned above as well as other wireless systems and radio technologies.

Figure 1:
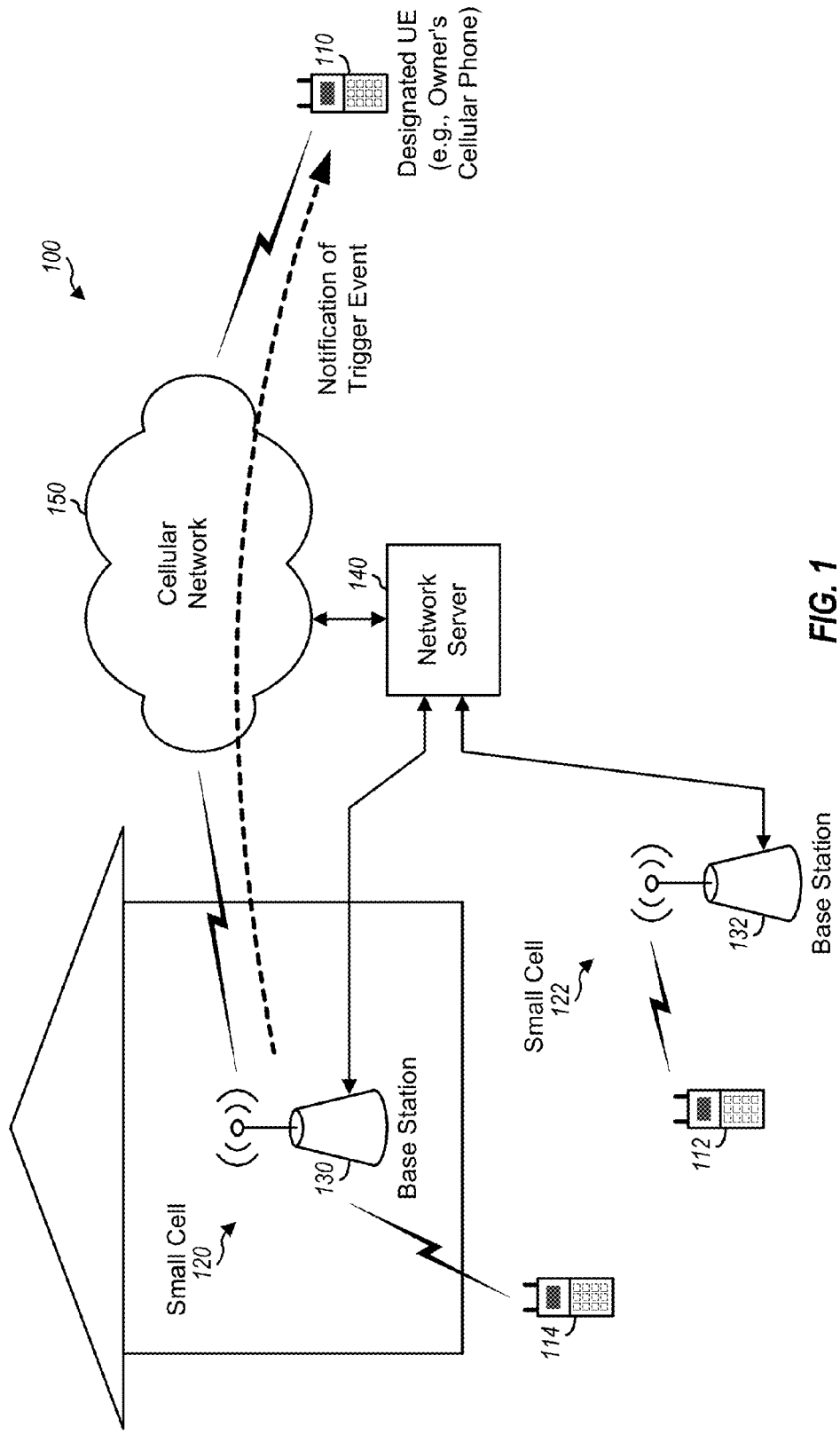
FIG. 1 shows an exemplary system deployment.

FIG. 1 shows an exemplary system deployment 100 in which various aspects of the present disclosure may be implemented. A small cell 120 may support communication for a small geographic area such as a home, an apartment, an office, a shop, etc. Small cell 120 may include a base station 130 supporting wireless communication for UEs located within the coverage area of small cell 120. Similarly, another small cell 122 may support communication for another geographic area (e.g., a neighboring home) and may include a base station 132 supporting wireless communication for UEs located within the coverage area of small cell 122. In general, any number of base stations for any number of small cells may be deployed near the vicinity of one another. A base station for a small cell may also be referred to as a small cell device.

A base station may be an access point (AP) utilizing a radio technology such as WiFi, Hiperlan, etc. An access point may support communication for a basic service set (BSS), which includes a set of stations that can communicate with each other. The BSS may also be referred to as a wireless local area network (WLAN) system.

A base station may also be a home base station supporting a femto cell and utilizing a radio technology such as LTE, WCDMA, CDMA 1X, GSM, etc. A home base station may also be referred to as a home access point, a home Node B (HNB), a home evolved Node B (HeNB), etc. A home base station may be configured to provide restricted access for a group of UEs, which may belong in a closed subscriber group (CSG). A home base station may allow a network operator to extend the coverage of a cellular system, to increase system capacity, and/or to obtain other advantages. A home base station may be considered as part of the cellular system and may communicate with other network entities in the cellular system. A home base station may operate as described in 3GPP TR 25.820, entitled "3G Home NodeB Study Item Technical Report," which is publicly available. A home base station may also operate as described in documents for other radio technologies. A home base station may include a radio network controller (RNC), which may perform some functions normally performed by an RNC in a cellular system.

In general, base stations 130 and 132 may each be an access point, a home base station, or some other entity supporting communication for a small geographic area. For example, base stations 130 and 132 may be two access points in two WLAN systems for neighboring homes. Base stations 130 and 132 may also be two home base stations in neighboring homes for two femto cells in the same cellular system.

Base stations 130 and 132 may be coupled to a network server 140 via an Internet backhaul. Network server 140 may perform coordination and control functions for all base stations coupled to the network server. For example, network server 140 may control or supervise configuration of the base stations coupled to the network server, control switching of UEs between a WLAN system and a cellular system in a small cell, control switching of UEs from the small cell to an external wireless system, etc. Network server 140 may couple to a core network (not shown in FIG. 1), which may include various network entities supporting communication and other services for UEs.

UEs 110 to 114 may be dispersed throughout the coverage area of small cells 120 and 122. A UE may be stationary or mobile and may also be referred to as a mobile station, a terminal, an access terminal, a subscriber unit, a station (STA), etc. A UE may be a cellular phone, a smartphone, a tablet, a wireless communication device, a personal digital assistant (PDA), a wireless modem, a handheld device, a laptop computer, a cordless phone, a wireless local loop (WLL) station, a netbook, a smartbook, etc. A UE may be able to communicate with a base station for a small cell. A UE may also be able to communicate with a base station for a macro cell in a cellular system.

Base station 130 may be deployed in a home (as shown in FIG. 1) or some other location. Base station 130 may operate as configured by a manager (e.g., an owner) of base station 130 and/or other authorized persons. In normal operation, base station 130 may support wireless communication for UEs located within its coverage, as configured for base station 130. Base station 130 may occasionally encounter error conditions and may convey the error conditions to elicit intervention by the manager.

Conventionally, a device such as a home base station may show an alarm message via an indicator on the device. However, the device may be a small unit and may not have any (or may have a limited) alarm indicator display on its surface. This lack of (or limited) alarm indicator display may not be able to efficiently convey the alarm message, especially when the alarm message is large. Furthermore, a manager of the device may not be nearby to monitor the alarm indicator on the device.

In an aspect of the present disclosure, which may be referred to as network-based alarming, a base station may notify a designated UE whenever certain trigger events occur at the base station. The base station may be an access point in a WLAN system or a home base station (a femto cell) in a cellular system. The designated UE may be a cellular phone, a smartphone, a laptop computer, etc. The designated UE may belong to a manager (e.g., an owner) of the base station or some other person or entity designated to maintain the base station. The base station may send alarm or notification messages for detected trigger events to the manager for timely intervention.

As shown in FIG. 1, base station 130 may send notification messages and/or other information in electronics form to UE 110, which may be designated to receive such information. In one design, base station 130 may send a notification message and/or other information in an email or a text message to UE 110. In this design, UE 110 may receive notification messages and/or other information with standard software and applications on UE 110. In another design, base station 130 may send a notification message and/or other information via a proprietary interface to UE 110. In this design, an application supporting interaction with base station 130 may be downloaded onto UE 110. This application may facilitate communication between base station 130 and UE 110 and may also facilitate display of notification messages and/or other information at UE 110. Base station 130 may send notification messages and/or other information in electronics form to UE 110 in other manners.

Figure 2:
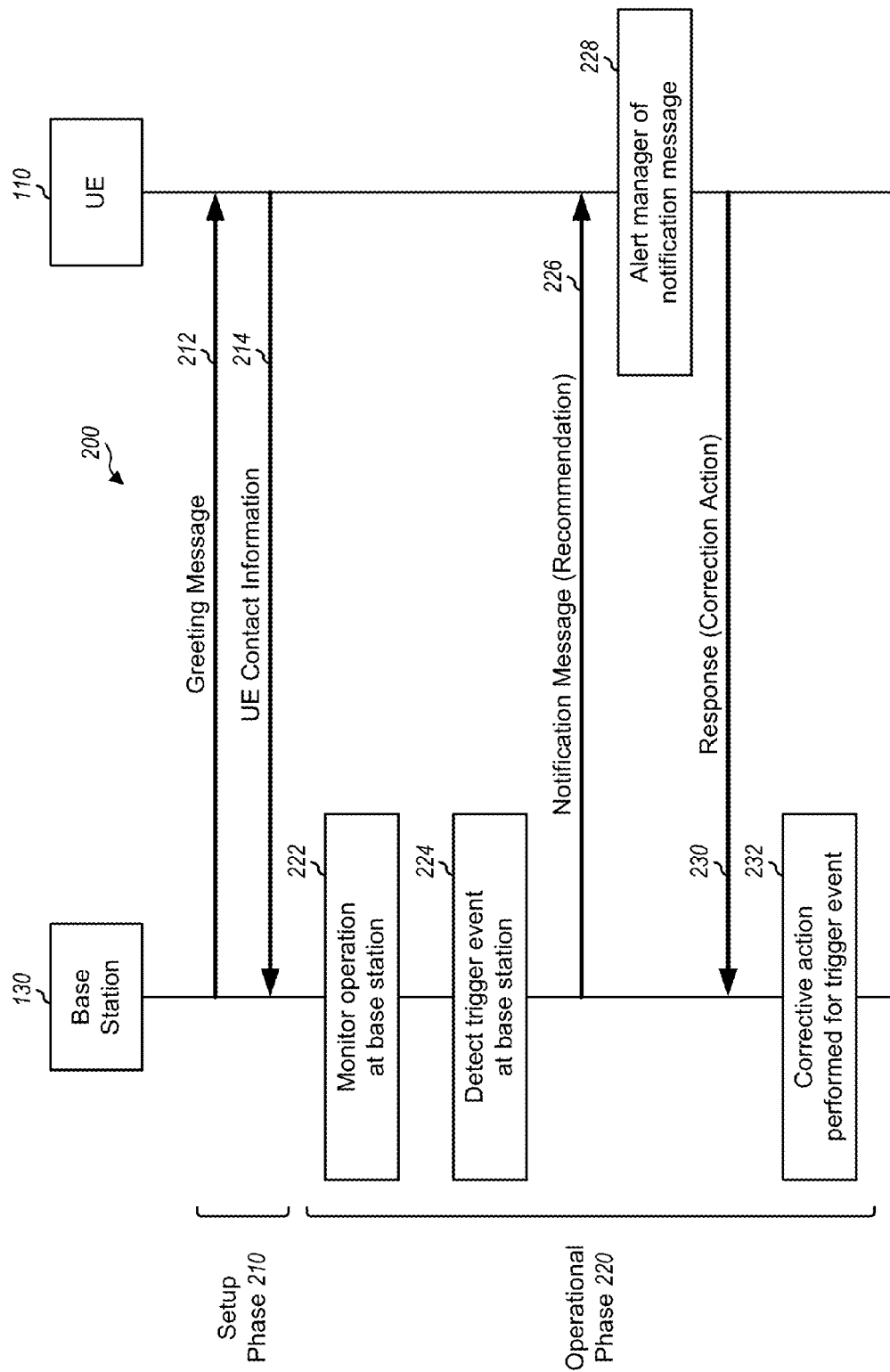
FIG. 2 shows a process for network-based alarming.

FIG. 2 shows an exemplary design of a process 200 for network-based alarming Process 200 includes a setup phase 210 and an operational phase 220. In setup phase 210, base station 130 may be configured with electronics contact information for a UE designated to receive notification messages from base station 130, which may be UE 110. The contact information may be dependent on the particular electronics form in which notification messages are sent to UE 110. For example, the contact information for UE 110 may be (i) an email address if notification messages are sent via emails to UE 110 or (ii) a telephone number if notification messages are sent via text messages to UE 110. The notification messages may also be sent in other manners, and the contact information may comprise other information. In any case, base station 130 may send a greeting message to UE 110 during setup of base station 130 (step 212). UE 110 may receive the greeting message and may reply with its contact information (block 214). The contact information may be modified (e.g., to a new email address) at a later time by sending a modification message to base station 130.

In operational phase 220, base station 130 may detect for trigger events and notify UE 110 whenever a trigger event is detected. Base station 130 may monitor its operational status and resources (step 222). Base station 130 may detect a trigger event at the base station (step 224). In response, base station 130 may send a notification message to UE 110 (block 226), which may be designated to receive the notification message and may be a cellular phone of a manager of base station 130. Base station 130 may be a femto cell and may send the message via a cellular system. Alternatively, base station 130 may be an access point and may send the message via a WLAN system. In general, base station 130 may send the message using any radio technology supported by base station 130. Base station 130 may also send the notification message to network controller 140, which may forward the message to one or more base stations of one or more other radio technologies for transmission to UE 110. In any case, UE 110 may receive the notification message from base station 130 and may alert the manager of the received notification message, e.g., via ring tone, vibration, etc. (step 228). UE 110 may also display the notification message, e.g., when requested by the manager. The notification message may also include information regarding possible corrective actions. The manager may perform one or more corrective actions (not shown in FIG. 2) and may send a response to base station 130 to acknowledge accomplishment of the performed action(s) (step 230). After receiving the response, base station 130 may check the effectiveness of the performed action(s) and may inform the manager again if the action(s) are not effective. Alternatively, base station 130 may autonomously perform one or more corrective actions associated with the notification message, without requiring a response from the manager (step 232), as shown in FIG. 2.

FIG. 2 shows an exemplary design of a process for network-based alarming. Network-based alarming may also be implemented in other manners, e.g., based on different steps, different sequences of steps, etc.

Base station 130 may send notification messages based on various trigger events, which may include one or more of the following:

1. Reception of a large number of registration/association requests from alien UEs,
2. Detection of the base station being physically close to a neighbor cell,
3. Detection of insufficient hardware resources at the base station,
4. Detection of insufficient backhaul capability of the base station,
5. Detection of excessive interference on the uplink caused by at least one UE,
6. Detection of hardware failure or backhaul disconnection of the base station,
7. Detection of ineffective corrective action by the manager, and
8. Other trigger events.

For trigger event 1, base station 130 may support a CSG and may detect that it receives a large number of registration/association requests from alien UEs, which are UEs not in the CSG. The large number of registration/association requests may be quantified by the number of registration/association requests received by base station 130 within a certain time period exceeding a high threshold. Base station 130 may send a notification message to UE 110 to inform the manager of the detected trigger event. Base station 130 may also send a recommendation to address the trigger event, e.g., in the notification message. For example, base station 130 may suggest the manager to take corrective action by moving base station 130 to a better location (e.g., closer to the center of a house or an apartment) to cause less interference on the downlink. This may result in fewer alien UEs detecting base station 130 with high received signal strength, which may in turn result in fewer alien UEs attempting to access base station 130 by sending registration requests and/or association requests to base station 130.

For trigger event 2, base station 130 may detect that it is physically close to a neighbor base station. Base station 130 may measure received pilot strength and determine pathloss of neighbor base stations during a listening period. Base station 130 may consider a neighbor base station to be physically close if (i) the received pilot strength of the neighbor base station is above a first threshold and/or (ii) the pathloss between base station 130 and the neighbor base station is less than a second threshold. Base station 130 may send a notification message to UE 110 to inform the manager of the detected condition. Base station 130 may also suggest the manager to take corrective action, e.g., to move base station 130 to a better location farther away from a neighbor base station that is deemed too close. The better location may be (i) closer to the center of the house or apartment or (ii) away from the side of the house or apartment where the neighbor base station is located.

For trigger event 3, base station 130 may detect that it has insufficient hardware resources. Hardware resources may be quantified by the number of downlink channel elements available at base station 130 to process downlink signals sent to UEs, the number of uplink channel elements available at base station 130 to process uplink signals received from UEs, the amount of memory available at base station 130 to store data for UEs, etc. Base station 130 may determine that it has insufficient hardware resources, e.g., when its channel elements and/or memory are frequently fully occupied. Base station 130 may send a notification message to UE 110 to inform the manager of the detected condition of insufficient hardware resources. Base station 130 may also suggest the manager to take corrective action, e.g., to upgrade base station 130 with better hardware capability and/or to install an additional base station to handle some of the load of base station 130.

For trigger event 4, base station 130 may detect that it has insufficient backhaul capability, e.g., due to its backhaul limit being reached frequently. Base station 130 may send a notification message to UE 110 to inform the manager of the detected condition of limited backhaul capability. Base station 130 may also suggest the manager to take corrective action, e.g., to increase the backhaul limit.

For trigger event 5, base station 130 may detect excessive interference on the uplink caused by at least one UE and may be jammed by the interfering UE(s). Each interfering UE may be identified by its UE identity (ID), which may be an International Mobile Subscriber Identity (IMSI), a phone number, a Medium Access Control (MAC) ID, etc. Interference may be quantified by an uplink noise rise or some other quantity. Excessive interference may be quantified by interference at base station 130 exceeding a threshold or based on some other criteria. Base station 130 may send a notification message to UE 110 to inform the manager of the detected excessive interference. Base station 130 may also suggest the manager to take corrective action, e.g., to move base station 130 away from the interfering UE(s) and/or move the interfering UE(s) away from base station 130.

For trigger event 6, base station 130 may detect hardware failure or backhaul disconnection of base station 130. Base station 130 may send a notification message to UE 110 to inform the manager of the detected hardware failure or backhaul disconnection. Base station 130 may also suggest the manager to take corrective action, e.g., to check the base station hardware and/or the backhaul connection.

For trigger event 7, base station 130 may detect ineffective corrective action by the manager for a trigger event or condition notified by base station 130. Corrective action by the manager may be deemed to be ineffective, e.g., if the condition persists after a certain number of attempts to correct the problem. Base station 130 may send a notification message to UE 110 to inform the manager of the ineffective corrective action. Base station 130 may also suggest the manager to take certain corrective action, e.g., to contact a technician for on-site maintenance.

Some exemplary trigger events and corrective actions have been described above. In general, any set of trigger events and corrective actions may be supported by base station 130. Each trigger event may be associated with one or more possible notification messages and one or more possible corrective actions.

The network-based alarming techniques disclosed herein may provide certain advantages. First, the manager of base station 130 may be informed quickly in electronics form even if the manager is not located near base station 130. Second, base station 130 may be able to provide pertinent information in a notification message sent to UE 110, which may have better display capability than base station 130. This may enable base station 130 to send pertinent information to the manager, which base station 130 may not be able to convey if it has limited alarm indicator display. For example, the notification message may provide detailed reasons for the message and/or suggestions for corrective actions in order to assist the manager's intervention. Third, notification messages may be readily reconfigured and updated, e.g., from a server by downloading the latest version of firmware/software to base station 130. For example, message types, contents, and/or triggers may be updated via firmware/software. Fourth, notification messages may be personalized, e.g., based on the manager's preference. For example, the manager may be interested in receiving notification messages for only certain trigger events, or receiving only certain information in notification messages, or receiving only certain suggestions, etc. Fifth, interactive intervention by the manager may be supported. During an intervention process by the manager in response to a notification message, base station 130 may provide options available for the intervention (e.g., in electronic form for display at UE 110) for the manager to choose. Base station 130 may also provide feedback for the results of the manager's intervention for display at UE 110.

Figures 3, 4:
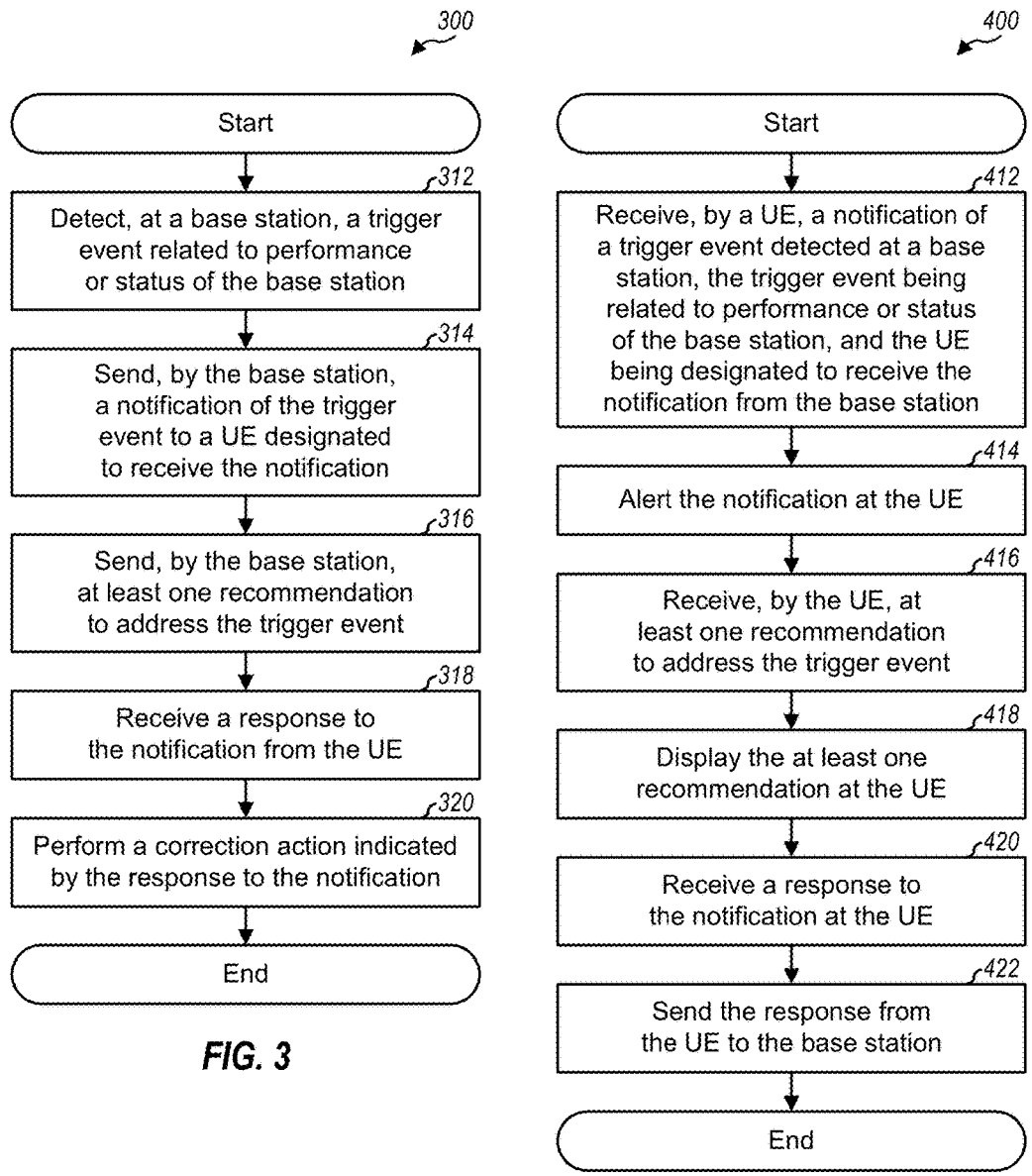
FIG. 3 shows a process for sending notification messages for network-based alarming.
FIG. 4 shows a process for receiving notification messages for network-based alarming.

FIG. 3 shows an exemplary design of a process 300 for sending notification messages for network-based alarming Process 300 may be performed by a base station (e.g., base station 130 in FIG. 1), as described below, or by some other entity. The base station may be for a small cell and may either (i) have closed access and support communication for a group of UEs in a CSG or (ii) have open access and support communication for all UEs within its coverage.

The base station may detect a trigger event related to performance or status of the base station (block 312). For example, the trigger event may be related to inadequate performance and/or failure status of the base station. The base station may send a notification of the trigger event to a UE designated to receive the notification (block 314). The base station may also send at least one recommendation to address the trigger event (block 316). The base station may receive a response to the notification from the UE (block 318). The response may indicate that a corrective action has been performed to address the trigger event. Alternatively, the response may indicate a selected corrective action, and the base station may perform the corrective action indicated in the response (block 320).

The base station may detect trigger events of various types. Trigger events of different types may be detected based on different criteria. Furthermore, trigger events of different types may be associated with (i) different recommendations to address these trigger events and/or (ii) different corrective actions. The base station may perform certain corrective actions by itself or with authorization from the manager. For example, the base station may open itself for access by UEs. Other corrective actions may be performed for the base station, e.g., to move or upgrade the base station.

In one design, the trigger event may be related to reception of a large number of registration/association requests from UEs by the base station. The large number may be quantified by the number of registration/association requests received within a particular time period exceeding a high threshold. In another design, the trigger event may be related to detection of the base station being physically close to a neighbor base station. Physically close may be quantified by the received signal for the neighbor base station, as measured at the base station, exceeding a threshold. In other designs, the trigger event may be related to detection of insufficient hardware resources at the base station, or detection of insufficient backhaul capability of the base station, or detection of excessive interference received by the base station from at least one UE, or detection of hardware failure and/or backhaul disconnection of the base station, or detection of ineffective corrective action for a prior detected failure event at the base station, etc.

FIG. 4 shows an exemplary design of a process 400 for receiving notification messages for network-based alarming Process 400 may be performed by a UE (e.g., UE 110 in FIG. 1), as described below, or by some other entity. The UE may receive a notification of a trigger event detected at a base station (block 412). The trigger event may be related to performance or status of the base station. The UE may be designated to receive the notification from the base station. The UE may alert a manager of the notification (block 414). For example, the UE may display the notification on a display of the UE and/or emit a sound in order to alert the manager of the notification. The UE may also receive at least one recommendation to address the trigger event (block 416). The UE may display the at least one recommendation (block 418). The UE may receive (e.g., from the manager of the base station) a response to the notification (block 420). The response may indicate that a corrective action has been performed to address the trigger event. Alternatively, the response may indicate a selected corrective action, and the UE may send the response conveying the selected corrective action to the base station (block 422).

In another aspect of the present disclosure, which may be referred to as network-based reconfiguration, a base station for a small cell may be reconfigured by a network server based on performance metrics for the base station and other base stations in a wireless system (e.g., a cellular system). The reconfiguration may improve the performance of the base station and possibly other base stations in the wireless system.

As noted above, base stations for small cells may be widely deployed, e.g., by residential managers. These small cells may be part of a wireless system. A network operator may seek assistance from small cell managers in order to improve performance of the wireless system. For example, the small cells may be part of an open-access system, and the network operator may determine that a small cell in a particular residence is located near a hotspot with high traffic load. The network operator may then advise the manager of the small cell in that residence to open the small cell for access by other UEs. The network operator may also request the small cell manager to increase the number of cells with open access, increase the hardware capability of the small cell, improve the location of a base station for the small cell, increase backhaul capability of the small cell, etc. The network operator may encourage assistance by the small cell manager by offering credits and/or incentives to the manager. The network operator may send a request for network assistance along with the credits and/or incentives to the small cell manager. This request may be referred to as a reconfiguration request, etc. The network operator may effectively and timely improve the performance of the wireless system via assistance of managers of appropriate small cells in the wireless system.

Figure 5:
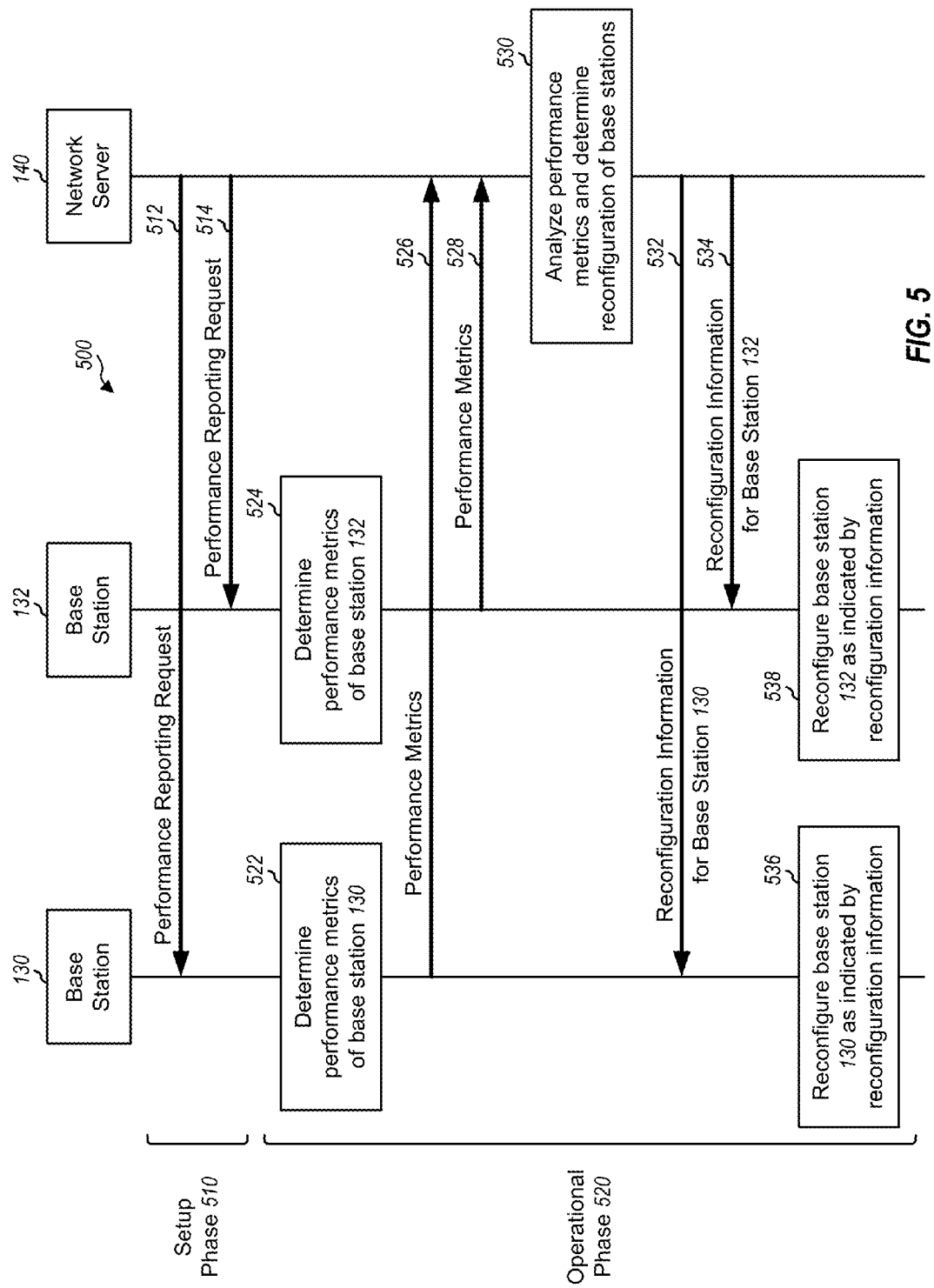
FIG. 5 shows a process for network-based reconfiguration.

FIG. 5 shows an exemplary design of a process 500 for network-based reconfiguration. Process 500 includes a setup phase 510 and an operational phase 520. In setup phase 510, base station 130 may be requested to report performance metrics for base station 130 to network server 140 (step 512). Other base stations such as neighbor base station 132 may also be requested to report their performance metrics to network server 140. Each base station may be requested to report its performance metrics periodically (e.g., based on a predetermined schedule) and/or whenever triggered by certain events (e.g., whenever the performance metrics change by more than predetermined thresholds). The reporting configuration of a base station may be changed at any time.

In operational phase 520, base station 130 may determine its performance metrics (step 522) and may report its performance metrics to network server 140 (step 526). Similarly, base station 132 for neighbor small cell 122 may determine its performance metrics (step 524) and may report its performance metrics to network server 140 (step 528). Other base stations may also determine and report their performance metrics to network server 140.

Network server 140 may receive the performance metrics for all base stations configured to report the performance metrics. Network server 140 may analyze the performance metrics received from all base stations and may determine suitable reconfiguration of one or more base stations such that good performance can be achieved for the base stations and the wireless system (step 530). In one design, network server 140 may send reconfiguration information for base station 130 directly to base station 130, as shown in FIG. 5 (step 532). In another design, network server 140 may send reconfiguration information for base station 130 to the manager of base station 130 (not shown in FIG. 5). For example, network server 140 may send the reconfiguration information to UE 110, which may be designated to receive the reconfiguration information. UE 110 may be a cellular phone or a smartphone of the manager of base station 130. Network server 140 may send the reconfiguration information in an email, a text message, etc. In any case, base station 130 may be reconfigured based on the reconfiguration information for base station 130 (step 536). Base station 130 may be reconfigured by the manager or may autonomously reconfigure itself. Network server 140 may also send reconfiguration information to base station 132 (step 534), and base station 132 may be reconfigured based on the reconfiguration information (step 538). Base station 132 may be reconfigured by the manager or may autonomously reconfigure itself.

As shown in FIG. 5, network-based reconfiguration may be implemented electronically. Base stations for small cells may automatically send their performance metrics to network server 140, without any intervention by their managers. Network server 140 may send reconfiguration messages to the base stations and/or their managers for reconfiguration of the base stations.

Base station 130 may send performance metrics, which may include one or more of the following:
1. Traffic load and location of the base station,
2. Number of registration/association requests received by the base station,
3. Backhaul usage by the base station,
4. Hardware capability of the base station.
5. Pathloss to neighbor base stations,
6. Hardware failure or backhaul disconnection of the base station, and
7. Other performance metrics.

For performance metric 1, network server 140 may detect base stations with high traffic load and base stations with light traffic load based on the reported performance metrics from the base stations. Network server 140 may also determine the traffic load of macro base stations and/or pico base stations in the wireless system. Network server 140 may reconfigure the base stations such that traffic load can be balanced across the wireless system. For example, network server 140 may detect that base station 130 (which may serve closed access small cell 120) is located in a hotspot area in which a macro base station and/or a pico base station may have high traffic load. Network server 140 may then request a manager of base station 130 to open base station 130 for access by other UEs in order to offload the high traffic load from the macro base station and/or the pico base station to base station 130. Network server 140 may also provide credits and/or other incentives to entice and compensate the manager of base station 130 to open access to other UEs.

For performance metric 2, network server 140 may determine that base station 130 (which may be for small cell 120 having closed access) receives a large number of registration/association requests from alien UEs. The large number of registration/association requests may be quantified by the number of registration/association requests received by base station 130 within a certain time period exceeding a high threshold. Network server 140 may advise the manager to move base station 130 to a better location (e.g., closer to the center of a house or an apartment) to cause less interference on the downlink, which may in turn result in fewer alien UEs attempting to access base station 130 by sending registration requests and/or association requests to base station 130. Alternatively, network server 140 may advise the manager to open base station 130 for access by other UEs. Network server 140 may provide credits to entice and compensate the manager for opening base station 130 for access.

For performance metric 3, network server 140 may detect that base station 130 has limited backhaul capability and frequently reaches its backhaul limit. Network server 140 may advise the manager of base station 130 to increase the backhaul capability of base station 130. Network server 140 may provide credits to entice and compensate the manager for the cost of the higher backhaul capability if base station 130 has open access and can serve other UEs.

For performance metric 4, network server 140 may detect that base station 130 frequently reaches its hardware capacity, e.g., due to channel elements or memory of base station 130 being fully occupied. Network server 140 may advise the manager of base station 130 to upgrade base station 130 with better hardware capability and/or to add one or more additional base stations for one or more additional small cells.

For performance metric 5, network server 140 may detect that base station 130 is physically close to a neighbor cell. Network server 140 may make this determination based on pilot strength/pathloss measurements made by base station 130 during listening periods for the wireless system, or via comparison of GPS coordinates of base station 130 and neighbor base stations, etc. Network server 140 may advise the manager to move base station 130 to a better location farther away from the neighbor base stations.

For performance metric 6, network server 140 may detect hardware failure or backhaul disconnection of base station 130. Network server 140 may advise the manager to check the hardware and/or backhaul connection of base station 130

Figure 6:
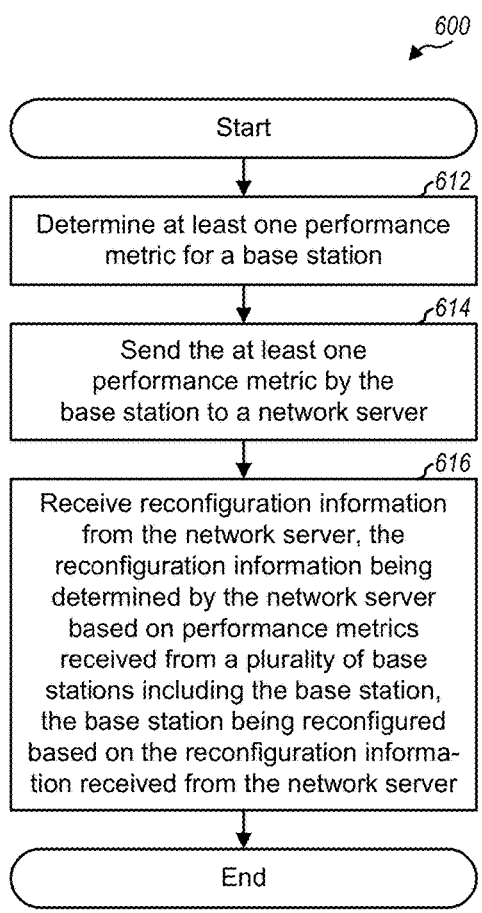
FIG. 6 shows a process for supporting network-based reconfiguration.

FIG. 6 shows an exemplary design of a process 600 for supporting network-based reconfiguration. Process 600 may be performed by a base station (e.g., base station 130), as described below, or by some other entity. The base station may be for a small cell and may either (i) have closed access and support communication for a group of UEs in a CSG or (ii) have open access and support communication for all UEs within its coverage.

The base station may determine at least one performance metric for the base station (block 612). The base station may send the at least one performance metric to a network server (block 614). The base station may receive reconfiguration information from the network server (block 616). The reconfiguration information may be determined by the network server based on performance metrics received from a plurality of base stations including the base station. The base station may be reconfigured based on the reconfiguration information received from the network server. The base station may send all or part of the reconfiguration information to a UE, which may belong to a manager designated to manage the base station.

For block 612, the base station may determine the at least one performance metric based on traffic load of the base station, or a number of registration/association requests received by the base station, or backhaul usage by the base station, or hardware capability of the base station, or pathloss from the base station to at least one neighbor base station, or hardware failure of the base station, or backhaul disconnection of the base station, or a combination thereof.

For block 614, the reconfiguration information may comprise at least one recommendation to open the base station for access by UEs, or move the base station, or upgrade hardware capability of the base station, or upgrade backhaul capability of the base station, or check the hardware of the base station, or check the backhaul connection of the base station, or some other action, or a combination thereof.

For block 616, reconfiguration of the base station may be performed by the base station or some other entity or person. For example, the base station may receive reconfiguration information comprising a recommendation to open the base station for access by UEs. The base station may then open itself (e.g., after receiving authorization from the manager) for access by UEs not in the CSG. The base station may also be physically moved, upgraded, and/or repaired by the manager or some other person based on the reconfiguration information.

Figure 7:
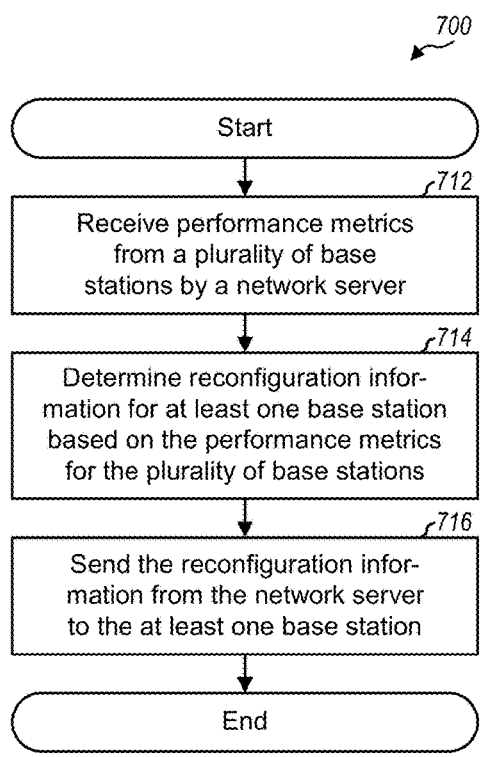
FIG. 7 shows a process for performing network-based reconfiguration.

FIG. 7 shows an exemplary design of a process 700 for performing network-based reconfiguration. Process 700 may be performed by a network server (e.g., network server 140), as described below, or by some other entity. The network server may receive performance metrics from a plurality of base stations (block 712). The network server may determine reconfiguration information for at least one base station, among the plurality of base stations, based on the performance metrics for the plurality of base stations (block 714). The network server may send the reconfiguration information to the at least one base station (block 716). A base station may send all or part of its reconfiguration information to a UE, which may belong to a manager designated to manage the base station.

For block 712, the performance metrics for the plurality of base stations may relate to traffic load of the base stations, or the number of registration/association requests received by the base stations, or backhaul usage by the base stations, or hardware capability of the base stations, or pathloss between base stations, or hardware failure of the base stations, or backhaul disconnection of the base stations, or some other feature or status of the base stations, or a combination thereof.

For block 714, the network server may determine at least one recommendation for a base station to open the base station for access by UEs (e.g., UEs not in a CSG of the base station), or move the base station, or upgrade the hardware capability of the base station, or upgrade the backhaul capability of the base station, or check the hardware of the base station, or check the backhaul connection of the base station, or some other action, or a combination thereof.

Figure 8:
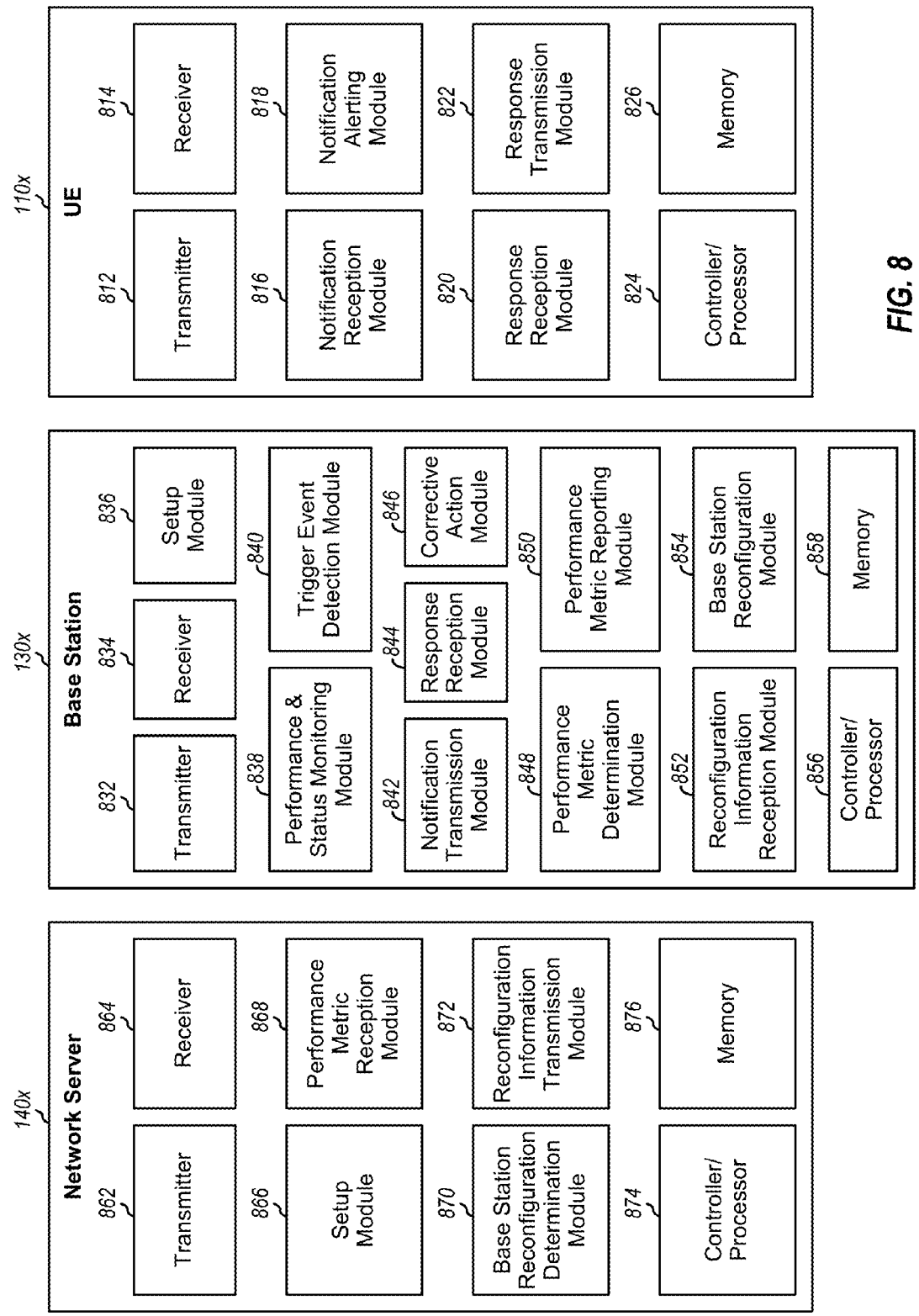
FIG. 8 shows a design of a UE, a base station, and a network server.

FIG. 8 shows a block diagram of a UE 110x, a base station 130x, and a network server 140x, which are one design of UE 110, base station 130, and network server 140, respectively, in FIG. 1. Base station 130x and UE 110x support network-based alarming. Base station 130x and network server 140x support network-based reconfiguration.

At base station 130x, a module 836 may perform setup for network-based alarming and/or network-based reconfiguration. For example, module 836 may perform steps 212 and 214 in FIG. 2 and/or steps 512 and 514 in FIG. 5. A module 838 may monitor the performance and/or status of base station 130x. A module 840 may detect for trigger events based on the monitored performance and/or status of base station 130x. Module 840 may detect for any of the trigger events described above and/or other trigger events. A module 842 may send a notification message to a designated UE (e.g., UE 110x) whenever a trigger event is detected. Module 842 may also include one or more recommendations in the notification message. A module 844 may receive a response from the designated UE for the notification message. A module 846 may perform one or more corrective actions, e.g., as indicated by the response received from the designated UE and/or independent of any response from the designated UE or manager.

A module 848 may determine performance metrics for base station 130x, which may include any of the performance metrics described above and/or other performance metrics. A module 850 may report the performance metrics to network server 140x, e.g., as configured for base station 130x during the setup phase of network-based reconfiguration. A module 852 may receive reconfiguration information for base station 130x from network server 140x. The reconfiguration information may indicate a reconfiguration of base station 130x. A module 854 may reconfigure base station 130x as indicated by the reconfiguration information. For example, module 854 may open base station 130x for access by other UEs as requested by the reconfiguration information. Module 854 may also alert the manager of base station 130x of the reconfiguration information, e.g., by displaying the reconfiguration information and/or emitting designated sound at base station 130x. Module 854 may also send the reconfiguration information to the designated UE, which may alert the manager of the reconfiguration information.

A transmitter 832 and a receiver 834 may support communication with UE 110x and network server 140x. For example, transmitter 832 may send notification messages to UE 110x, send performance metrics to network server 140x, etc. Receiver 834 may receive responses from UE 110x, receive reconfiguration information from network server 140x, etc. The various modules within base station 830x may operate as described above. A controller/processor 856 may direct the operation of various modules within base station 830x. A memory 858 may store data and program codes for base station 830x.

At UE 110x, a module 816 may receive notification messages from base station 130x for trigger events detected by base station 130x. A module 818 may alert the manager of the notification messages received by UE 110x. A module 820 may receive responses from the manager for the notification messages received by UE 110x. A module 822 may send the responses to base station 130x. A transmitter 812 and a receiver 814 may support communication with base station 130x. Transmitter 812 may generate and send signals comprising information to send by UE 110x. Receiver 814 may receive and process signals sent by base stations and/or other network entities. The various modules within UE 110x may operate as described above. A controller/processor 824 may direct the operation of various modules within UE 110x. A memory 826 may store data and program codes for UE 110x.

At network server 140x, a module 866 may perform setup for network-based alarming and/or network-based reconfiguration. For example, module 866 may perform steps 212 and 214 in FIG. 2 and/or steps 512 and 514 in FIG. 5. A module 868 may receive performance metrics from base station 130x and/or other base stations. A module 870 may reconfigure base station 130x and/or other base stations based on the performance metrics received from all base stations. A module 872 may send reconfiguration information to base station 130x and/or other base station. A transmitter 862 and a receiver 864 may support communication with base station 130x and/or other entities. The various modules within network server 140x may operate as described above. A controller/processor 874 may direct the operation of various modules within network server 140x. A memory 876 may store data and program codes for network server 140x.

The modules in FIG. 8 may comprise processors, electronic devices, hardware devices, electronic components, logical circuits, memories, software codes, firmware codes, etc., or any combination thereof.

Figure 9:
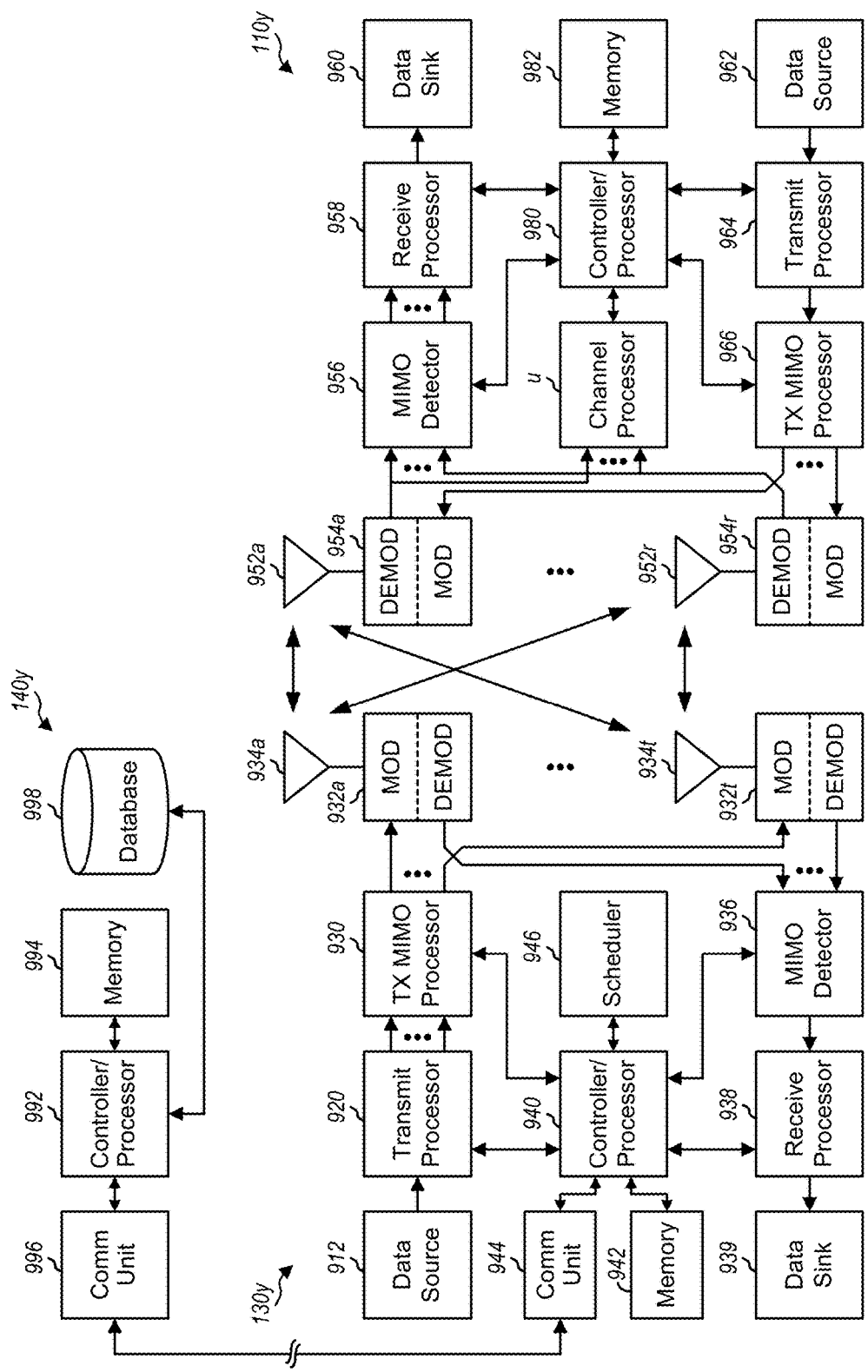
FIG. 9 shows another design of a UE, a base station, and a network server.

FIG. 9 shows a block diagram of a base station 130y, a UE 110y, and a network server 140y, which are another design of UE 110, base station 130, and network server 140, respectively, in FIG. 1. Base station 130y may be equipped with T antennas 934a through 934t, and UE 110y may be equipped with R antennas 952a through 952r, where in general T≥1 and R≥1.

At base station 130y, a transmit processor 920 may receive data from a data source 912 and control information from a controller/processor 940. Processor 920 may process (e.g., encode and modulate) the data and control information to obtain data symbols and control symbols, respectively. Processor 920 may also generate reference symbols for synchronization signals, reference signals, etc. A transmit (TX) multiple-input multiple-output (MIMO) processor 930 may perform spatial processing (e.g., precoding) on the data symbols, the control symbols, and/or the reference symbols, if applicable, and may provide T output symbol streams to T modulators (MODs) 932a through 932t. Each modulator 932 may process a respective output symbol stream (e.g., for OFDM, SC-FDMA, CDMA, etc.) to obtain an output sample stream. Each modulator 932 may further process (e.g., convert to analog, amplify, filter, and upconvert) the output sample stream to obtain a downlink signal. T downlink signals from modulators 932a through 932t may be transmitted via T antennas 934a through 934t, respectively.

At UE 110y, antennas 952a through 952r may receive the downlink signals from base station 130y and other base stations. Antennas 952a through 952r may provide received signals to demodulators (DEMODs) 954a through 954r, respectively. Each demodulator 954 may condition (e.g., filter, amplify, downconvert, and digitize) a respective received signal to obtain input samples. Each demodulator 954 may further process the input samples (e.g., for SC-FDMA, OFDMA, CDMA, etc.) to obtain received symbols. A MIMO detector 956 may obtain received symbols from all R demodulators 954a through 954r, perform MIMO detection on the received symbols if applicable, and provide detected symbols. A receive processor 958 may process (e.g., demodulate and decode) the detected symbols, provide decoded data for UE 110y to a data sink 960, and provide decoded control information to a controller/processor 980. A channel processor 984 at UE 110y may receive downlink signals from base station 130y and/or other base stations. Processor 980 may determine channel quality for base station 130y and/or other base stations based on the received downlink signals.

On the uplink, at UE 110y, a transmit processor 964 may receive data from a data source 962 and control information from controller/processor 980. Processor 964 may process (e.g., encode and modulate) the data and control information to obtain data symbols and control symbols, respectively. Processor 964 may also generate reference symbols for reference signals. The symbols from transmit processor 964 may be precoded by a TX MIMO processor 966 if applicable, further processed by modulators 954a through 954r (e.g., for OFDMA, SC-FDMA, CDMA, etc.), and transmitted to base station 130y and other base stations. At base station 130y, the uplink signals from UE 110y and other UEs may be received by antennas 934, processed by demodulators 932, detected by a MIMO detector 936 if applicable, and further processed by a receive processor 938 to obtain decoded data and control information sent by UE 110y and other UEs. Processor 938 may provide the decoded data to a data sink 939 and the decoded control information to controller/processor 940.

Controllers/processors 940 and 980 may direct the operation at base station 130y and UE 110y, respectively. Processor 940 and/or other processors and modules at base station 130y may perform or direct process 300 in FIG. 3, process 600 in FIG. 6, the portion of process 200 in FIG. 2 for base station 130, the portion of process 500 in FIG. 5 for base station 130, and/or other processes for the techniques described herein. Processor 980 and/or other processors and modules at UE 110y may perform or direct process 400 in FIG. 4, the portion of process 200 in FIG. 2 for UE 110, and/or other processes for the techniques described herein. Memories 942 and 982 may store data and program codes for base station 130y and UE 110y, respectively. A communication (Comm) unit 944 may enable base station 130y to communicate with other network entities. A scheduler 946 may schedule UEs for communication and may assign resources to the scheduled UEs.

Within network server 140y, a controller/processor 992 may perform various functions to support communication for UEs. Processor 992 and/or other processors and modules at network server 140y may perform or direct process 700 in FIG. 7, the portion of process 500 in FIG. 5 for network server 140, and/or other processes for the techniques described herein. A memory 994 may store program codes and data for network server 140y. A storage unit 994 may store information for UEs and/or wireless systems within the control of network server 140y. A communication unit 996 may enable network server 140y to communicate with other network entities.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   detecting, at a base station, a trigger event related to a performance or status problem at the base station; and
   sending, by the base station to a user equipment (UE) that belongs to a manager user designated to maintain the base station, a notification comprising pertinent information to inform the manager user about the detected trigger event related to the performance or status problem at the base station, wherein the notification further indicates a suggested corrective action for the manager user to perform to address the performance or status problem at the base station, and wherein the notification is sent to the UE during an interactive intervention process enabling the manager user to choose the suggested corrective action among one or more intervention options that are available to address the performance or status problem at the base station.

2. The method of claim 1, wherein the trigger event is related to the base station receiving a large number of registration/association requests from alien UEs that are not in the CSG within a certain time period.

3. The method of claim 1, wherein the trigger event is related to detection of the base station being physically close to a neighbor base station.

4. The method of claim 1, wherein the trigger event is related to detection of insufficient hardware resources at the base station.

5. The method of claim 1, wherein the trigger event is related to detection of insufficient backhaul capability of the base station.

6. The method of claim 1, wherein the trigger event is related to the base station detecting excessive uplink interference caused by at least one UE.

7. The method of claim 1, wherein the trigger event is related to detection of one or more of a hardware failure, a backhaul disconnection, or a combination thereof at the base station.

8. The method of claim 1, wherein the trigger event is related to a corrective action that the manager user initiated for a prior detected failure event at the base station being deemed ineffective in response to the prior detected failure event persisting after a certain number of attempts to perform the corrective action.

9. The method of claim 1, further comprising:
sending, by the base station, at least one recommendation to address the trigger event to the UE that belongs to the manager user designated to maintain the base station.

10. The method of claim 1, further comprising:
receiving, from the UE that belongs to the manager user, an indication that the manager user performed the suggested corrective action to address the performance or status problem at the base station; and
checking, at the base station, effectiveness of the suggested corrective action.

11. The method of claim 1, further comprising:
receiving a response to the notification from the UE that belongs to the manager user; and
performing the suggested corrective action based on the response to the notification.

12. The method of claim 1, wherein the base station comprises a small cell supporting communication for a group of UEs in a closed subscriber group (CSG).

13. The method of claim 1, further comprising:
receiving, at the base station, an email address for the UE that belongs to the manager user designated to maintain the base station, wherein the notification to inform the manager user about the detected trigger event is an email sent to the email address for the UE.

14. The method of claim 1, further comprising:
receiving, at the base station, a telephone number for the UE that belongs to the manager user designated to maintain the base station, wherein the notification to inform the manager user about the detected trigger event is a text message sent to the telephone number for the UE.

15. The method of claim 1, wherein the suggested corrective action to address the performance or status problem comprises a suggestion to one or more of move the base station to a different location, upgrade hardware resources at the base station, upgrade network resources available to the base station, install one or more additional base stations to handle at least a portion of a load of the base station, or contact a technician to perform on-site maintenance on the base station.

16. The method of claim 1, further comprising:
autonomously performing the suggested corrective action at the base station.

17. The method of claim 1, further comprising:
downloading, at the base station, a software update that includes information related to one or more possible error conditions at the base station; and
configuring, at the base station, one or more of the trigger event or the notification based on the information included in the downloaded software update.

18. The method of claim 1, further comprising:
determining, at the base station, one or more preferences that the manager user has defined with respect to notification messages to be sent to the UE that belong to the manager user, wherein the notification is configured according to the one or more preferences.

19. An apparatus for wireless communication, comprising:
at least one processor configured to detect, at a base station, a trigger event related to a performance or status problem at the base station, and
a transmitter configured to send, by the base station to a user equipment (UE) that belongs to a manager user designated to maintain the base station, a notification comprising pertinent information to inform the manager user about the detected trigger event related to the performance or status problem at the base station, wherein the notification further indicates a suggested corrective action for the manager user to perform to address the performance or status problem at the base station, and wherein the notification is sent to the UE during an interactive intervention process enabling the manager user to choose the suggested corrective action among one or more intervention options that are available to address the performance or status problem at the base station.

20. The apparatus of claim 19, wherein the trigger event is related to one or more of reception of a large number of registration/association requests at the base station from alien UEs that are not in a closed subscriber group (CSG) for the base station, detection of the base station being physically close to a neighbor base station, detection of insufficient hardware resources at the base station, detection of insufficient backhaul capability of the base station, detection of excessive uplink interference caused by at least one UE, detection of a hardware failure of the base station, detection of a backhaul disconnection of the base station, a corrective action that the manager user initiated for a prior detected failure event at the base station being deemed ineffective, or a combination thereof.

21. The apparatus of claim 19, wherein the transmitter is further configured to send at least one recommendation to address the trigger event to the UE that belongs to the manager user designated to maintain the base station.

22. The apparatus of claim 19, further comprising:
a receiver configured to receive a response to the notification from the UE that belongs to the manager user, wherein the at least one processor is further configured to perform the suggested corrective action based on the response to the notification.

23. An apparatus for wireless communication, comprising:
means for detecting, at a base station, a trigger event related to a performance or status problem at the base station; and
means for sending, by the base station to a user equipment (UE) that belongs to a manager user designated to maintain the base station, a notification comprising pertinent information to inform the manager user about the detected trigger event related to the performance or status problem at the base station, wherein the notification further indicates a suggested corrective action for the manager user to perform to address the performance or status problem at the base station, and wherein the notification is sent to the UE during an interactive intervention process enabling the manager user to choose the suggested corrective action among one or more intervention options that are available to address the performance or status problem at the base station.

24. The apparatus of claim 23, wherein the trigger event is related to one or more of reception of a large number of registration/association requests at the base station from alien UEs that are not in a closed subscriber group (CSG) for the base station, detection of the base station being physically close to a neighbor base station, detection of insufficient hardware resources at the base station, detection of insufficient backhaul capability of the base station, detection of excessive uplink interference caused by at least one UE, detection of a hardware failure of the base station, detection of a backhaul disconnection of the base station, a corrective action that the manager user initiated for a prior detected failure event at the base station being deemed ineffective, or a combination thereof.

25. The apparatus of claim 23, further comprising:
means for sending at least one recommendation to address the trigger event to the UE that belongs to the manager user designated to maintain the base station.

26. The apparatus of claim 23, further comprising:
means for receiving a response to the notification from the UE that belongs to the manager user; and
means for performing the suggested corrective action based on the response to the notification.

27. A non-transitory computer-readable medium, comprising code for causing at least one processor to:
detect, at a base station, a trigger event related to a performance or status problem at the base station; and
send, by the base station to a user equipment (UE) that belongs to a manager user designated to maintain the base station, a notification comprising pertinent information to inform the manager user about the detected trigger event related to the performance or status problem at the base station, wherein the notification further indicates a suggested corrective action for the manager user to perform to address the performance or status problem at the base station, and wherein the notification is sent to the UE during an interactive intervention process enabling the manager user to choose the suggested corrective action among one or more intervention options that are available to address the performance or status problem at the base station.

28. A method for wireless communication, comprising:
receiving, at a user equipment (UE) that belongs to a manager user designated to maintain a base station, a notification comprising pertinent information to inform the manager user about a trigger event detected at the base station, the trigger event related to a performance or status problem at the base station; and
alerting the manager user of the notification received at the UE, wherein the notification further indicates a suggested corrective action for the manager user to perform to address the performance or status problem at the base station, and wherein the notification is received at the UE during an interactive intervention process enabling the manager user to choose the suggested corrective action among one or more intervention options that are available to address the performance or status problem at the base station.

29. The method of claim 28, wherein alerting the manager user of the notification received at the UE comprises one or more of displaying the notification on a display of the UE, emitting a sound, vibrating, or a combination thereof to alert the manager user of the notification received at the UE.

30. The method of claim 28, further comprising:
receiving, by the UE, at least one recommendation to address the trigger event; and
displaying the at least one recommendation at the UE.

31. The method of claim 30, wherein the at least one recommendation to address the trigger event comprises one or more of a suggestion to move the base station to a different location, upgrade hardware resources at the base station, upgrade network resources available to the base station, install one or more additional base stations to handle at least a portion of a load of the base station, or contact a technician to perform on-site maintenance on the base station.

32. The method of claim 28, further comprising:
receiving a response to the notification at the UE; and
sending the response from the UE to the base station, wherein the response sent to the base station indicates that the manager user initiated the suggested corrective action to address the performance or status problem at the base station.

33. The method of claim 28, wherein the UE receives the notification from another base station via a network controller.

34. The method of claim 28, wherein the notification to inform the manager user about the trigger event detected at the base station comprises one or more of an email or a text message received at the UE.

35. An apparatus for wireless communication, comprising:
means for receiving, at a user equipment (UE) that belongs to a manager user designated to maintain a base station, a notification comprising pertinent information to inform the manager user about a trigger event detected at the base station, the trigger event related to a performance or status problem at the base station; and
means for alerting the manager user of the notification received at the UE, wherein the notification further indicates a suggested corrective action for the manager user to perform to address the performance or status problem at the base station, and wherein the notification is received at the UE during an interactive intervention process enabling the manager user to choose the suggested corrective action among one or more intervention options that are available to address the performance or status problem at the base station.

36. The apparatus of claim 35, wherein the means for receiving is configured to receive the notification from another base station via a network controller.

37. A non-transitory computer-readable medium, comprising code for causing at least one processor to:
receive, at a user equipment (UE) that belongs to a manager user designated to maintain a base station, a notification comprising pertinent information to inform the manager user about a trigger event detected at the base station, the trigger event related to a performance or status problem at the base station; and
alert the manager user of the notification received at the UE, wherein the notification further indicates a suggested corrective action for the manager user to perform to address the performance or status problem at the base station, and wherein the notification is received at the UE during an interactive intervention process enabling the manager user to choose the suggested corrective action among one or more intervention options that are available to address the performance or status problem at the base station.

38. The non-transitory computer-readable medium of claim 37, wherein the notification is received at the UE from another base station via a network controller.

39. An apparatus for wireless communication, comprising:
at least one processor configured to:
receive, at a user equipment (UE) that belongs to a manager user designated to maintain a base station, a notification comprising pertinent information to inform the manager user about a trigger event detected at the base station, the trigger event related to a performance or status problem at the base station; and
alert the manager user of the notification received at the UE, wherein the notification further indicates a suggested corrective action for the manager user to perform to address the performance or status problem at the base station, and wherein the notification is received at the UE during an interactive intervention process enabling the manager user to choose the suggested corrective action among one or more intervention options that are available to address the performance or status problem at the base station.

40. The apparatus of claim 39, wherein the at least one processor is configured to one or more of display the notification on a display of the UE, emit a sound, vibrate, or a combination thereof to alert the manager user of the notification received at the UE.

41. The apparatus of claim 39, wherein the at least one processor is configured to:
receive at least one recommendation to address the trigger event; and
display the at least one recommendation at the UE.

42. The apparatus of claim 39, wherein the at least one processor is configured to:
receive a response to the notification at the UE, and
send the response from the UE to the base station, wherein the response sent to the base station indicates that the manager user initiated the suggested corrective action to address the performance or status problem at the base station.

43. The apparatus of claim 39, wherein the at least one processor is configured to receive the notification from another base station via a network controller.

* * * * *